(12) United States Patent
Depondt

(10) Patent No.: US 9,751,502 B2
(45) Date of Patent: Sep. 5, 2017

(54) WIPER DEVICE

(75) Inventor: Helmut Depondt, Kessel-Lo (BE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 13/993,868

(22) PCT Filed: Nov. 7, 2011

(86) PCT No.: PCT/EP2011/069549
§ 371 (c)(1),
(2), (4) Date: Jun. 13, 2013

(87) PCT Pub. No.: WO2012/079843
PCT Pub. Date: Jun. 21, 2012

(65) Prior Publication Data
US 2013/0255026 A1    Oct. 3, 2013

(30) Foreign Application Priority Data
Dec. 13, 2010  (DE) .................. 10 2010 062 933

(51) Int. Cl.
*B60S 1/40* (2006.01)

(52) U.S. Cl.
CPC ........... *B60S 1/4003* (2013.01); *B60S 1/4045* (2013.01); *B60S 1/4048* (2013.01); *B60S 2001/4051* (2013.01); *B60S 2001/4054* (2013.01)

(58) Field of Classification Search
CPC .... B60S 1/4003; B60S 1/4038; B60S 1/4045; B60S 1/4048; B60S 2001/4051; B60S 1/4054; B60S 1/4061; B60S 2001/4054; B60S 2001/4061
USPC ........... 15/250.32, 250.43, 250.44, 250.361, 15/250.201
See application file for complete search history.

(56) References Cited

U.S. PATENT DOCUMENTS

| | | | |
|---|---|---|---|
| 6,782,581 B2 | 8/2004 | Block | |
| 7,634,833 B2* | 12/2009 | Boland et al. | 15/250.32 |
| 7,716,780 B2* | 5/2010 | Scholl et al. | 15/250.32 |
| 8,881,338 B2* | 11/2014 | Thielen et al. | 15/250.32 |
| 2007/0214593 A1* | 9/2007 | Boland | 15/250.23 |

(Continued)

FOREIGN PATENT DOCUMENTS

| | | |
|---|---|---|
| CN | 1513711 | 7/2004 |
| CN | 1655975 | 8/2005 |
| DE | 10130903 A1 * | 5/2002 |

(Continued)

OTHER PUBLICATIONS

International Search Report for Application No. PCT/EP2011/069549 dated Dec. 29, 2011 (2 pages).

*Primary Examiner* — Gary Graham
(74) *Attorney, Agent, or Firm* — Michael Best & Friedrich LLP

(57) ABSTRACT

The invention relates to a wiper device for a motor vehicle window, comprising a wiper arm adapter unit (10a-10e) and a wiper blade adapter unit (12a-12e), which in an installed state create a form fit, and further comprising a longitudinal guide unit (20a-20e) for guiding the wiper arm adapter unit (10a-10e). According to the invention, the wiper device comprises a locking means (14a-14e) which is movably mounted on the wiper blade adapter unit (12a-12e) and is provided so as to limit the freedom of movement of the wiper arm adapter unit (10a-10e) in the installed state at least substantially in a longitudinal direction (16a-16e).

6 Claims, 5 Drawing Sheets

(56) References Cited

U.S. PATENT DOCUMENTS

2009/0064438 A1* 3/2009 Boland et al. ............. 15/250.32

FOREIGN PATENT DOCUMENTS

| DE | 202004012300 | | 7/2005 |
|----|--------------|---|---------|
| DE | 102007058091 | | 6/2009 |
| DE | 102008021457 | | 11/2009 |
| FR | 2781741 | * | 2/2000 |
| JP | 2003512248 | | 4/2003 |
| JP | 2003127840 | | 5/2003 |
| JP | 2007313998 | | 12/2007 |
| RU | 2271287 | | 3/2006 |

* cited by examiner

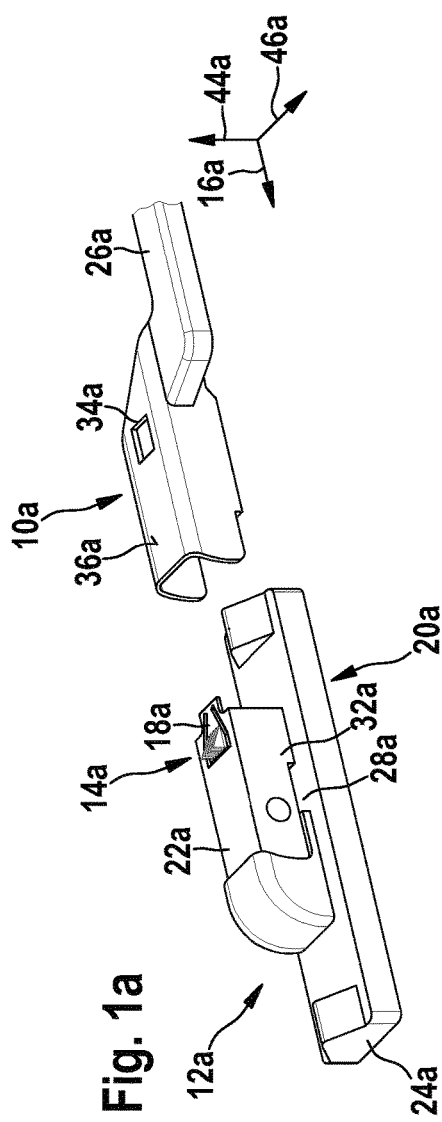
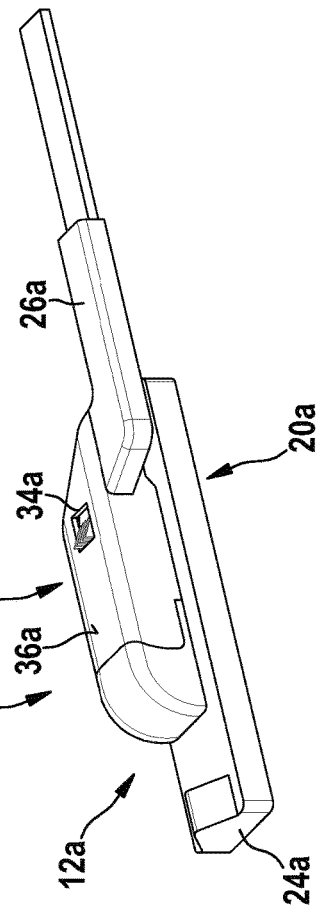
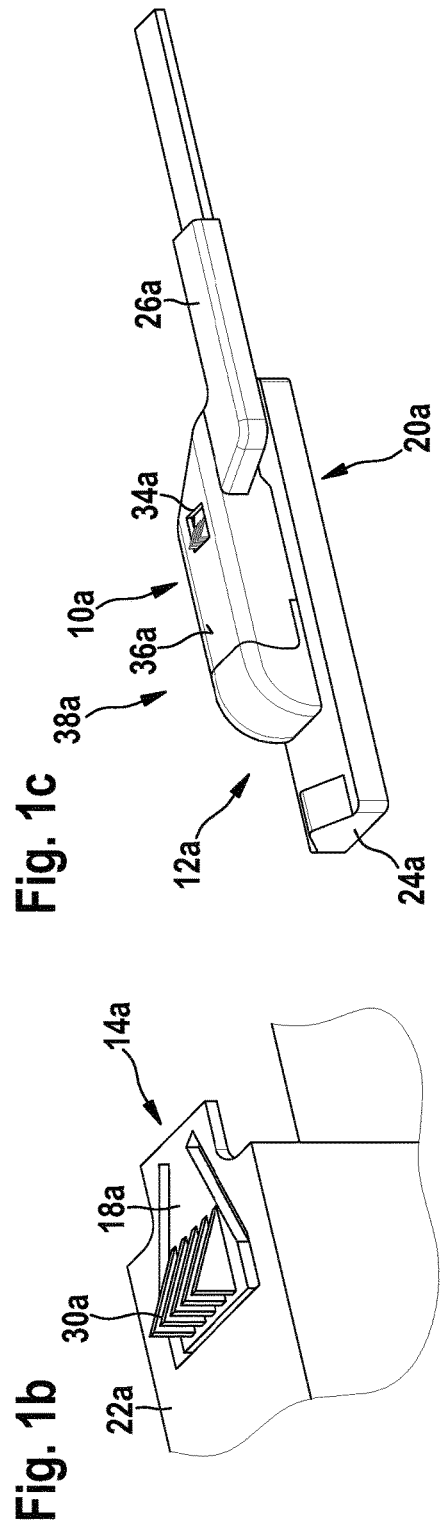

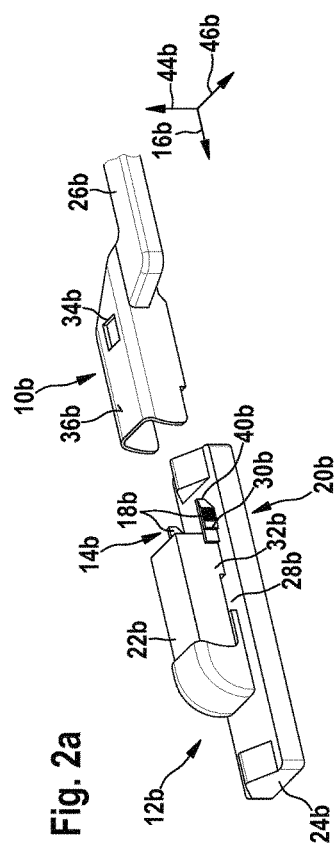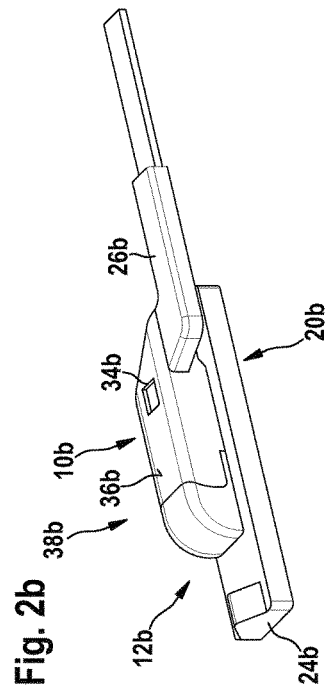

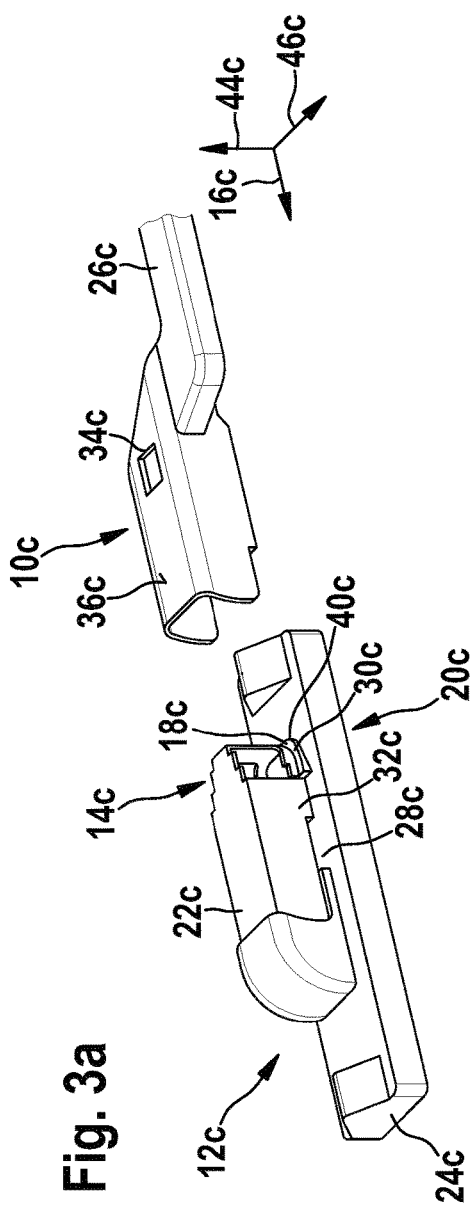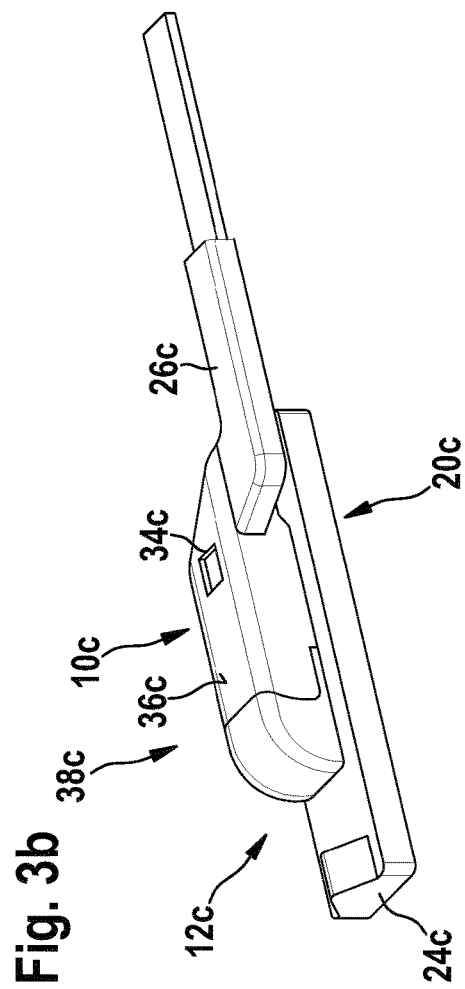

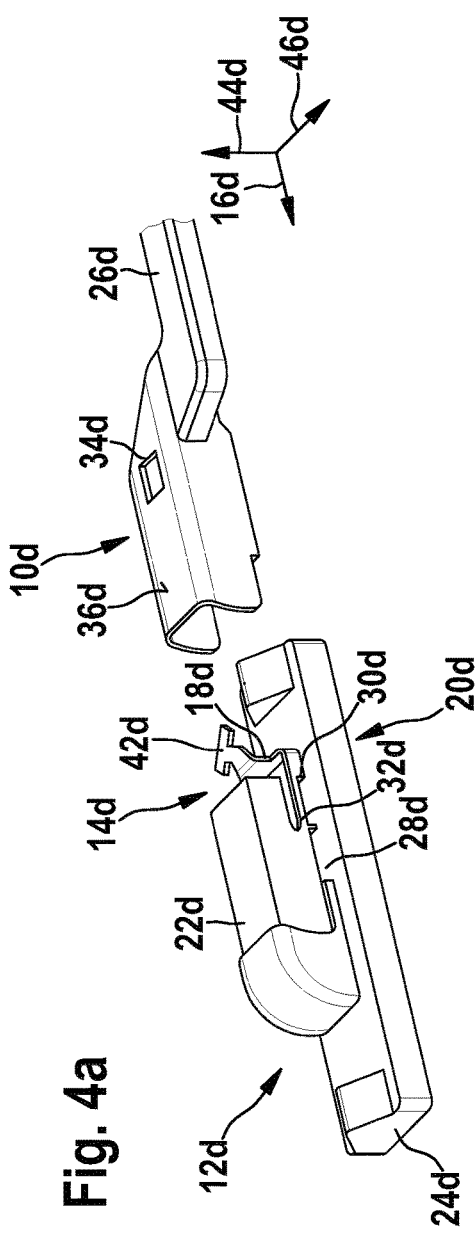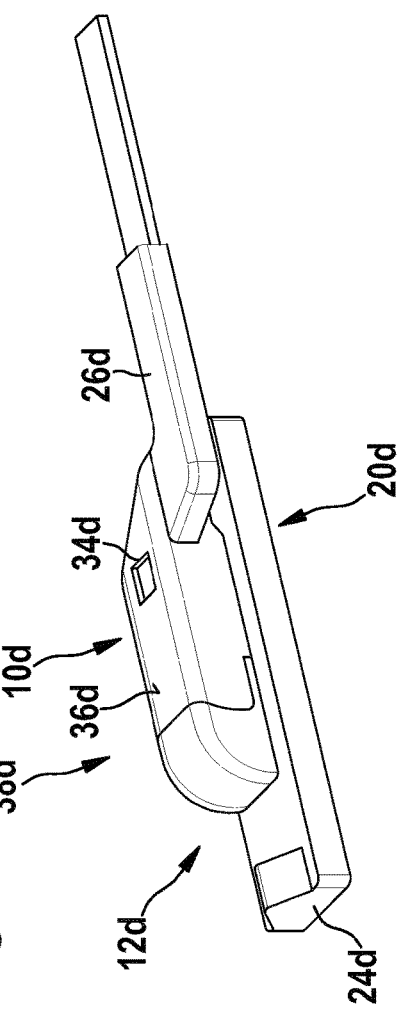

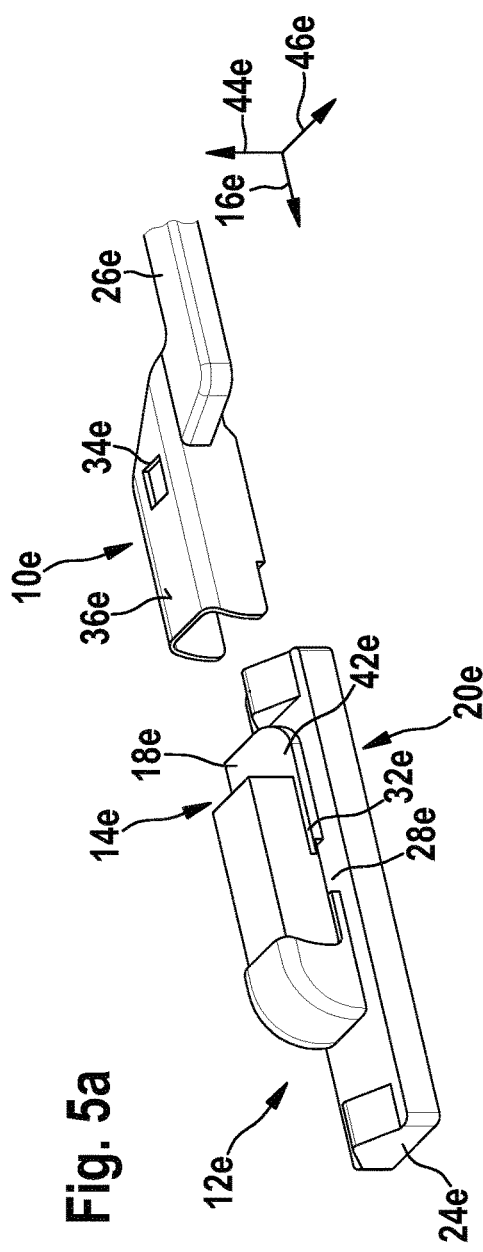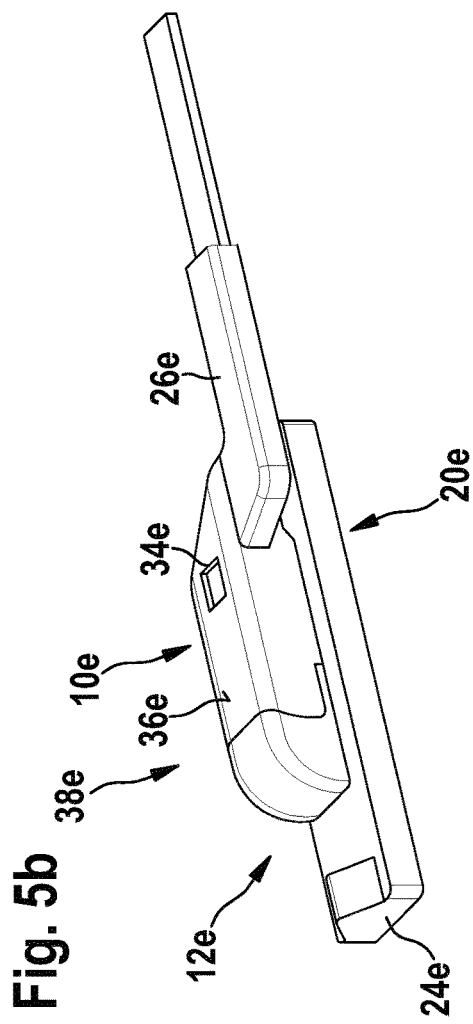

WIPER DEVICE

BACKGROUND OF THE INVENTION

The invention relates to a wiper device.

A wiper device for a motor vehicle window is already known, said wiper device comprising a wiper arm adapter unit and a wiper blade adapter unit, which in an installed state create a form fit.

SUMMARY OF THE INVENTION

The invention relates to a wiper device for a motor vehicle window, comprising a wiper arm adapter unit and a wiper blade adapter unit, which in an installed state create a form fit, and further comprising a longitudinal guide unit for guiding the wiper arm adapter unit.

According to the invention, the wiper device comprises a locking means which is movably mounted on the wiper blade adapter unit and is provided so as to limit the freedom of movement of the wiper arm adapter unit in the installed state at least substantially in a longitudinal direction, whereby a particularly simple assembly of the wiper arm adapter unit to the wiper blade adapter unit can be achieved. By the term "wiper blade adapter unit", particularly an adapter unit is to be understood in this context which comprises a contact region to a wiper blade component and is permanently connected to the wiper blade component. The wiper blade adapter unit is thereby provided to supply a coupling region on the wiper blade component for a coupling and/or a contacting with the wiper arm adapter unit. The wiper blade adapter unit preferably comprises a base body, which provides a coupling surface for the coupling and/or contacting of the wiper arm adapter unit. By the term "wiper arm adapter unit" particularly an adapter unit is to be understood in this context which comprises a contact region to a wiper arm component and is permanently connected to the wiper arm component. The wiper arm adapter unit is thereby provided to supply a contact region on the wiper arm component for a coupling and/or contacting with the wiper blade adapter unit. By the term "provided", specially equipped and/or designed is to be particularly understood in this context. By the term "installed state", particularly a state is to be understood in this context in which the wiper blade adapter unit and the wiper arm adapter unit are coupled to one another. By the term "longitudinal direction", particularly a direction is to be understood in this context which at least substantially extends parallel to a main extension direction of the wiper blade adapter unit. By the term "substantially", particularly a deviation of less than 10 is to be understood in this context. By the term "longitudinal guide unit", particularly a unit is to be understood in this context which is provided to guide the wiper arm adapter unit substantially parallel to the longitudinal direction in relation to the wiper blade adapter unit.

According to a further embodiment of the invention, the locking means is designed as a detent means, whereby a particularly quick installation process can be achieved. By the term "detent means", particularly a means is understood in this context which undergoes an elastic deformation during an installation process.

If the detent means is integrally formed with a base body of the wiper blade adapter unit, the wiper blade adapter unit can be particularly cost-effectively manufactured. By the term "integrally", particularly integrally bonded is to be understood, as, for example, by means of a welding and/or adhesive bonding process etc, and integrally formed in a particularly advantageous manner as by means of manufacture in a single cast and/or manufacture in a single- or multi-component injection molding process.

The wiper blade adapter unit can absorb particularly large forces if the detent means is intended to be deflected at least substantially parallel with respect to a transverse direction of a base body of the wiper blade adapter unit. By the term "transverse direction", particularly a direction is to be understood in this context, which is perpendicular to the longitudinal direction and perpendicular to a vertical direction and extends parallel to a wiping plane. By the term "wiping plane", particularly an idealized plane is understood is this context which is wiped in an operating state by a wiper blade attached to the wiper blade adapter unit. By the term "vertical direction", particularly a direction is thereby to be understood in this context, which is perpendicular to the wiping plane.

According to a further embodiment of the invention, the detent means is provided so as to be deflected at least substantially parallel to a vertical direction of a base body of the wiper blade adapter unit during installation, whereby said detent means can be particularly easily manipulated.

If the wiper device comprises a covering, which in at least one operating state at least for the most part is formed from the wiper arm adapter unit, said wiper device can be particularly easily protected from outside influences, such as, for example, water. By the term "covering", a lateral wall which for the most part surrounds the wiper device and is provided to prevent a penetration by gases and/or liquids is to be understood in this context.

BRIEF DESCRIPTION OF THE DRAWINGS

Further advantages ensue from the following description of the drawings. In the drawings, exemplary embodiments of the invention are depicted. The drawings, the description and the claims contain numerous features in combination. It is useful for the person skilled in the art to also look at the features individually and put them together to form additional practical combinations.

In the drawings:

FIGS. 1a to 1c show a perspective view of a wiper device during an installation operation.

FIGS. 2a and 2b show a perspective view of a further exemplary embodiment of a wiper device during an installation operation.

FIGS. 3a and 3b show a perspective view of a further exemplary embodiment of a wiper device during an installation operation.

FIGS. 4a and 4b show a perspective view of a further exemplary embodiment of a wiper device during an installation operation and FIGS. 5a and 5b show a perspective view of a further exemplary embodiment of a wiper device during an installation operation.

DETAILED DESCRIPTION

FIG. 1a shows an inventive wiper device comprising a wiper arm adapter unit 10a and a wiper blade adapter unit 12a in an unassembled state.

The wiper blade adapter unit 12a comprises a base body 22a, which is connected to a wiper blade 24a. A locking means 14a, which is embodied as a detent means 18a, is movably mounted on the base body 22a. In addition, the base body 22a comprises a longitudinal guide unit 20a, which has a lateral recess 28a that extends in a lateral wall 32a of the base body 22a substantially parallel to a longitudinal direction 16a as viewed in the main extension direction of said recess. A further lateral recess (not depicted) is disposed on another side of the base body 22a opposite to the lateral wall 32a.

The detent means 18a is integrally formed with the base body 22a and comprises a fluke 30a (FIG. 1b), which slopes in the longitudinal direction 16a. When mounting the wiper arm adapter unit 10a to the wiper blade adapter 12a, the detent means 18a is deflected by the wiper arm adapter unit 10a substantially parallel with respect to a vertical direction 44a.

The wiper arm adapter unit 10a is integrally formed with a wiper arm 26a. It is however also conceivable in this context for the wiper arm adapter unit 10a to be separately configured from the wiper arm 26a and to be connected to the same via a suitable connecting element. The wiper arm adapter unit 10a comprises a mounting recess 34a, in which the detent means 18a engages in an installed state (FIG. 1c) and thus prevents a movement of said wiper arm adapter unit 10a relative to the wiper blade adapter unit 12a in the longitudinal direction 16a. In an installed state, said wiper arm adapter unit 10a, with a visible outer surface 36a thereof, furthermore forms a large portion of a covering 38a of the wiper device.

In the installed state, the wiper adapter unit 10a engages into the lateral recess 28a, whereby a movement of said wiper arm adapter unit 10a relative to the wiper blade adapter unit 12 parallel to a vertical direction 44a is prevented. Said wiper arm adapter unit 10a lies partially flush with the base body 22a, whereby a movement of said wiper arm adapter unit 10a relative to the wiper blade adapter unit 12a parallel to a transverse direction 46a is prevented.

Four further exemplary embodiments of the invention are shown in FIGS. 2 to 5. The following descriptions are substantially limited to the differences between the exemplary embodiments, wherein reference can be made to the first exemplary embodiment with regard to parts, features and functions which do not change between embodiments. In order to distinguish between the exemplary embodiments, the letter a used with the reference numerals of the exemplary embodiment associated with FIG. 1 is replaced by the letters b to e used with the references numerals of the exemplary embodiments associated with the FIGS. 2 to 5. Reference can basically be made to the drawings and/or the description of the first exemplary embodiment with regard to components having like reference numerals, in particular with regard to components having the same reference numerals.

FIG. 2a shows a further exemplary embodiment of a wiper device comprising a wiper arm adapter unit 10b and a wiper blade adapter unit 12b in the unassembled state.

The wiper arm adapter unit 10b is integrally formed with a wiper arm 26b. In an installed state, the wiper arm adapter unit 10b, with a visible outer surface 36b thereof, furthermore forms a large portion of a covering 38b of the wiper device.

The wiper blade adapter unit 12b comprises a base body 22b. A locking means 14b, which is embodied as a detent means 18b, is movably mounted on the base body 22b. In addition, the base body 22b comprises a longitudinal guide unit 20b, which includes a lateral recess 28b that extends in a lateral wall 32b of the base body 22b substantially parallel to a longitudinal direction 16b as viewed in the main extension direction of said recess. A further lateral recess (not depicted) is disposed on another side of the base body 22b opposite to the lateral wall 32b.

The detent means 18b is integrally formed with the base body 22b and comprises a fluke 30b. The fluke 30b is of wedge-shaped design and is disposed on one side of the base body 22b, which side lies opposite to a wedge tip 40b. When mounting the wiper arm adapter unit 10b to the wiper blade adapter unit 12b, the detent means 18b is deflected by the wiper arm adapter unit 10b substantially parallel to a transverse direction 46b.

FIG. 2b shows the wiper device in an installed state. The wiper arm adapter unit 10b has been pushed onto the base body 22b of the wiper blade adapter unit 12b. In so doing, the wiper arm adapter unit 10b engages into the lateral recess 28b of the base body 22b and creates a form fit with said base body. A movement of the wiper arm adapter unit 10b relative to the wiper blade adapter unit 12b parallel to the transverse direction 46b as well as parallel to a vertical direction 44b is thereby prevented.

The detent means 18b engages behind a back stop (not depicted) of the wiper arm adapter unit 10b and thereby prevents a movement of said wiper arm adapter unit 10b relative to the wiper blade adapter unit 12b parallel to the longitudinal direction 16b.

FIG. 3a shows a further exemplary embodiment of a wiper device comprising a wiper arm adapter unit 10c and wiper blade adapter unit 12c in an unassembled state.

The wiper arm adapter unit 10c is integrally formed with a wiper arm 26c. In an installed state, the wiper arm adapter unit 10c, with a visible outer surface 36c thereof, furthermore forms a large portion of a covering 38c of the wiper device.

The wiper blade adapter unit 12c comprises a base body 22c. A locking means 14c, which is embodied as a detent means 18c, is movably mounted on the base body 22c. In addition, the base body 22c comprises a longitudinal guide unit 20c, which includes a lateral recess 28c that extends in a lateral wall 32c of the base body 22c substantially parallel to a longitudinal direction 16c as viewed in the main extension direction of said recess. A further lateral recess (not depicted) is disposed on another side of the base body 22c opposite to the lateral wall 32c.

The detent means 18c is integrally formed with the base body 22c and comprises a fluke 30c. The fluke 30c is of wedge-shaped design and is disposed on one side of the base body 22c, which side lies opposite to a wedge tip 40c. When mounting the wiper arm adapter unit 10c to the wiper blade adapter unit 12c, the detent means 18c is deflected by the wiper arm adapter unit 10c substantially parallel to a transverse direction 46c FIG. 3b shows the wiper device in an installed state. The wiper arm adapter unit 10c has been pushed onto the base body 22c of the wiper blade adapter unit 12c. In so doing, the wiper arm adapter unit 10c engages into the lateral recess 28c of the base body 22c and creates a form fit with said base body. A movement of the wiper arm adapter unit 10c relative to the wiper blade adapter unit 12c parallel to the transverse direction 46c as well as parallel to a vertical direction 44c is thereby prevented.

The detent means 18c engages behind a back stop (not depicted) of the wiper arm adapter unit 10c and thereby prevents a movement of said wiper arm adapter unit 10c relative to the wiper blade adapter unit 12c parallel to the longitudinal direction 16c.

FIG. 4a shows a further exemplary embodiment of a wiper device comprising a wiper arm adapter unit 10d and wiper blade adapter unit 12d in an unassembled state.

The wiper arm adapter unit 10d is integrally formed with a wiper arm 26d. In an installed state, the wiper arm adapter unit 10d, with a visible outer surface 36d thereof, furthermore forms a large portion of a covering 38d of the wiper device.

The wiper blade adapter unit 12d comprises a base body 22d. A locking means 14d, which is embodied as a detent means 18d, is movably mounted on the base body 22d. The detent means 18d is integrally formed with the base body 22d and has a deflectable, plate-like detent body 42d comprising a fluke 30d. The fluke 30d is of wedge-shaped design and is integrally formed with the detent body 42d. When mounting the wiper arm adapter unit 10d to the wiper blade adapter unit 12d, the detent means 18d is deflected by the wiper arm adapter unit 10d substantially in a vertical direction 44d.

In addition, the base body 22d comprises a longitudinal guide unit 20d, which includes a lateral recess 28d that extends in a lateral wall 32d of the base body 22d substantially parallel to a longitudinal direction 16d as viewed in the main extension direction of said recess.

FIG. 4b shows the wiper device in an installed state. The wiper arm adapter unit 10d has been pushed onto the base body 22d of the wiper blade adapter unit 12d. In so doing, the wiper arm adapter unit 10d engages into the lateral recess 28d of the base body 22d and creates a form fit with said base body. A movement of the wiper arm adapter unit 10d relative to the wiper blade adapter unit 12d parallel to a transverse direction 46d as well as parallel to the vertical direction 44d is thereby prevented.

The detent means 18d engages behind a back stop (not depicted) of the wiper arm adapter unit 10d and thereby prevents a movement of said wiper arm adapter unit 10d relative to the wiper blade adapter unit 12d parallel to the longitudinal direction 16d.

FIG. 5a shows a further exemplary embodiment of a wiper device comprising a wiper arm adapter unit 10e and wiper blade adapter unit 12e in an unassembled state.

The wiper arm adapter unit 10e is integrally formed with a wiper arm 26e. In an installed state, the wiper arm adapter unit 10e, with a visible outer surface 36e thereof, furthermore forms a large portion of a covering 38e of the wiper device.

The wiper blade adapter unit 12e comprises a base body 22e. A locking means 14e, which is embodied as a detent means 18e, is movably mounted on the base body 22e. The detent means 18e is integrally formed with the base body 22e and has a deflectable, plate-like detent body 42e. When mounting the wiper arm adapter unit 10e to the wiper blade adapter unit 12e, the detent means 18e is deflected by the wiper arm adapter unit 10e substantially counter to a vertical direction 44e.

In addition, the base body 22e comprises a longitudinal guide unit 20e, which includes a lateral recess 28e that extends in a lateral wall 32e of the base body 22e substantially parallel to a longitudinal direction 16e as viewed in the main extension direction of said recess.

FIG. 5b shows the wiper device in an installed state. The wiper arm adapter unit 10e has been pushed onto the base body 22e of the wiper blade adapter unit 12e. In so doing, the wiper arm adapter unit 10e engages into the lateral recess 28e of the base body 22e and creates a form fit with said base body. A movement of the wiper arm adapter unit 10e relative to the wiper blade adapter unit 12e parallel to a transverse direction 46e as well as parallel to the vertical direction 44e is thereby prevented.

The detent means 18e engages behind a back stop (not depicted) of the wiper arm adapter unit 10e and thereby prevents a movement of said wiper arm adapter unit 10e relative to the wiper blade adapter unit 12e parallel to the longitudinal direction 16e.

What is claimed is:

1. A wiper device for a motor vehicle window, comprising a wiper arm adapter unit (10a-10e) and a wiper blade adapter unit (12a-12e), which in an installed state create a form fit, and further comprising a longitudinal guide unit (20a-20e) for guiding the wiper arm adapter unit (10a-10e) along a longitudinal direction (16a-e), characterized by a locking means (14a-14e) which is movably mounted on the wiper blade adapter unit (12a-12e) and is provided so as to limit the freedom of movement of the wiper arm adapter unit (10a-10e) in the installed state at least substantially in the longitudinal direction (16a-16e), characterized in that the locking means (14a-14e) is embodied as a detent means (18a-18e) that includes a barb (30a-30d), and in that the barb (30a-30d) is positioned on the wiper blade adapter unit (12a-12c) such that the barb (30a-30d) is engaged by the wiper arm adapter unit (10a-10e) as the wiper arm adapter unit (10a-10e) is moved toward the wiper blade adapter unit (12a-12c) along the longitudinal direction (16a-16e), such that the barb (30a-30d) is pressed and moved along a transverse direction (46a-46e) that is perpendicular to the longitudinal direction (16a-e) and also perpendicular to a vertical direction (44a-44e), the vertical direction (44a-44e) being perpendicular to a wiping plane, and such that the barb is moved away from a naturally biased position by the movement of the wiper arm adapter unit (10a-10e) along the longitudinal direction (16a-16e), and such that the barb (30a-30d) returns toward the naturally biased position to inhibit the wiper blade adapter unit (12a-12c) from disengaging from the wiper arm adapter unit (10a-10e) when the wiper blade adapter unit (12a-12c) and the wiper arm adapter unit (10a-10e) are in the installed state, wherein the wiper blade adapter unit (12a-12c) includes a base body (22a-22e), wherein the base body (22a-22e) includes a lateral wall (32a-32e) defining three sides of a rectangular recess (28a-28e) along a bottom of the lateral wall (32a-32e) of the base body (22a-22e), wherein the lateral wall of the wiper arm adapter unit (10a-10e) includes a lower portion that, longitudinally between two of the sides thereof, extends into the recess (28a-28e) in the installed state, such that the lower portion of the lateral wall of the wiper arm adapter unit (10a-10e) prevents movement of the wiper arm adapter unit (10a-10e) along the vertical direction (44a, 44d, 44e), and wherein in the installed state the lateral wall (32a-32e) of the base body (22a-22e) further prevents the lower portion of the lateral wall of the wiper arm adapter unit (10a-10e) from moving in the longitudinal direction (16a-16e).

2. The wiper device according to claim 1, wherein the detent means (18a-18e) is integrally formed with the base body (22a-22e) of the wiper blade adapter unit (12a-12e).

3. The wiper device according to claim 1, characterized by a covering (38a-38e) which in at least one operating state is formed at least for the most part by the wiper arm adapter unit (10a-10e).

4. The wiper device according to claim 1, wherein the barb engages behind a back stop of the wiper arm adapter (10) in the installed state.

5. The wiper device according to claim 1, wherein the barb includes a wedge-shaped tip.

6. The wiper device according to claim 1, wherein the wiper arm adapter unit (10a-10e) is coupled to a wiper arm (26a-26e), and wherein the barb protrudes away from the base body (20*a*-22*e*) along the longitudinal direction (16*a*-16*e*) toward the wiper arm (26*a*-26*e*).

\* \* \* \* \*